(12) United States Patent
Okamura et al.

(10) Patent No.: US 11,264,022 B2
(45) Date of Patent: Mar. 1, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Yuki Okamura, Saitama (JP); Makoto Murata, Kanagawa (JP); Masafumi Kato, Kanagawa (JP); Kengo Yoshii, Tokyo (JP); Naoki Shibuya, Chiba (JP)

(73) Assignee: SONY CORPORATION, Tokyo (JP)

( * ) Notice: Subject to any disclaimer, the term of this patent is extended or adjusted under 35 U.S.C. 154(b) by 483 days.

(21) Appl. No.: 16/324,971

(22) PCT Filed: Jul. 6, 2017

(86) PCT No.: PCT/JP2017/024782
§ 371 (c)(1),
(2) Date: Feb. 12, 2019

(87) PCT Pub. No.: WO2018/034077
PCT Pub. Date: Feb. 22, 2018

(65) Prior Publication Data
US 2021/0295831 A1  Sep. 23, 2021

(30) Foreign Application Priority Data

Aug. 19, 2016 (JP) .............................. JP2016-161545

(51) Int. Cl.
*G10L 15/00* (2013.01)
*G10L 15/22* (2006.01)

(52) U.S. Cl.
CPC ........ *G10L 15/22* (2013.01); *G10L 2015/223* (2013.01)

(58) Field of Classification Search
CPC ..... G10L 15/22; G10L 15/222; G06F 16/438; G06F 16/4393
See application file for complete search history.

(56) References Cited

U.S. PATENT DOCUMENTS 9,288,249 B1 * 3/2016 Chang ................ H04N 21/8547
10,229,669 B2 * 3/2019 Ikeda ....................... G10L 13/08
(Continued)

FOREIGN PATENT DOCUMENTS

JP  2002-108380 A  4/2002
JP  2011-043710 A  3/2011
(Continued)

*Primary Examiner* — Daniel Abebe
(74) *Attorney, Agent, or Firm* — Paratus Law Group, PLLC

(57) ABSTRACT

There is provided an information processing apparatus, method, and program. The information processing apparatus includes: an information acquisition unit configured to acquire input information of a user that includes a time lag between an input start and end, in a mode in which a plurality of contents are consecutively provided via at least one non-content period; and an output control unit configured, in a case where the input information is acquired in a content period in which first content or second content to be provided at a time later than the first content is being provided, to cause an output unit to output first output information on the basis of the input information, and in a case where the input information is acquired in the non-content period, to cause the output unit to output second output information different from the first output information, on the basis of the input information.

20 Claims, 13 Drawing Sheets

(56) References Cited

U.S. PATENT DOCUMENTS

| | | | |
|---|---|---|---|
| 10,362,127 B2* | 7/2019 | Vyas | G06Q 30/0269 |
| 2015/0269009 A1* | 9/2015 | Faaborg | A61B 5/6898 |
| | | | 719/315 |
| 2019/0281130 A1* | 9/2019 | Spagnola | H04L 67/2852 |
| 2020/0293538 A1* | 9/2020 | Mattsson | G06F 16/4387 |
| 2021/0027785 A1* | 1/2021 | Kahan | G10L 15/26 |

FOREIGN PATENT DOCUMENTS

| | | |
|---|---|---|
| JP | 2012-173850 A | 9/2012 |
| JP | 2015-106203 A | 6/2015 |

\* cited by examiner

FIG. 2

| Start | Stop | Next | Option |
|---|---|---|---|
| Music<br>Running<br>Photo / Interval Photo<br>Video<br>My Radio<br>Weather<br>News<br>... | Music<br>Running<br>Photo / Interval Photo<br>Video<br>My Radio<br>Weather<br>News<br>... | Song<br>Corner<br>News<br>Mail<br>Content<br>... | Repeat<br>More Detail<br>Previous<br>Help<br>... |

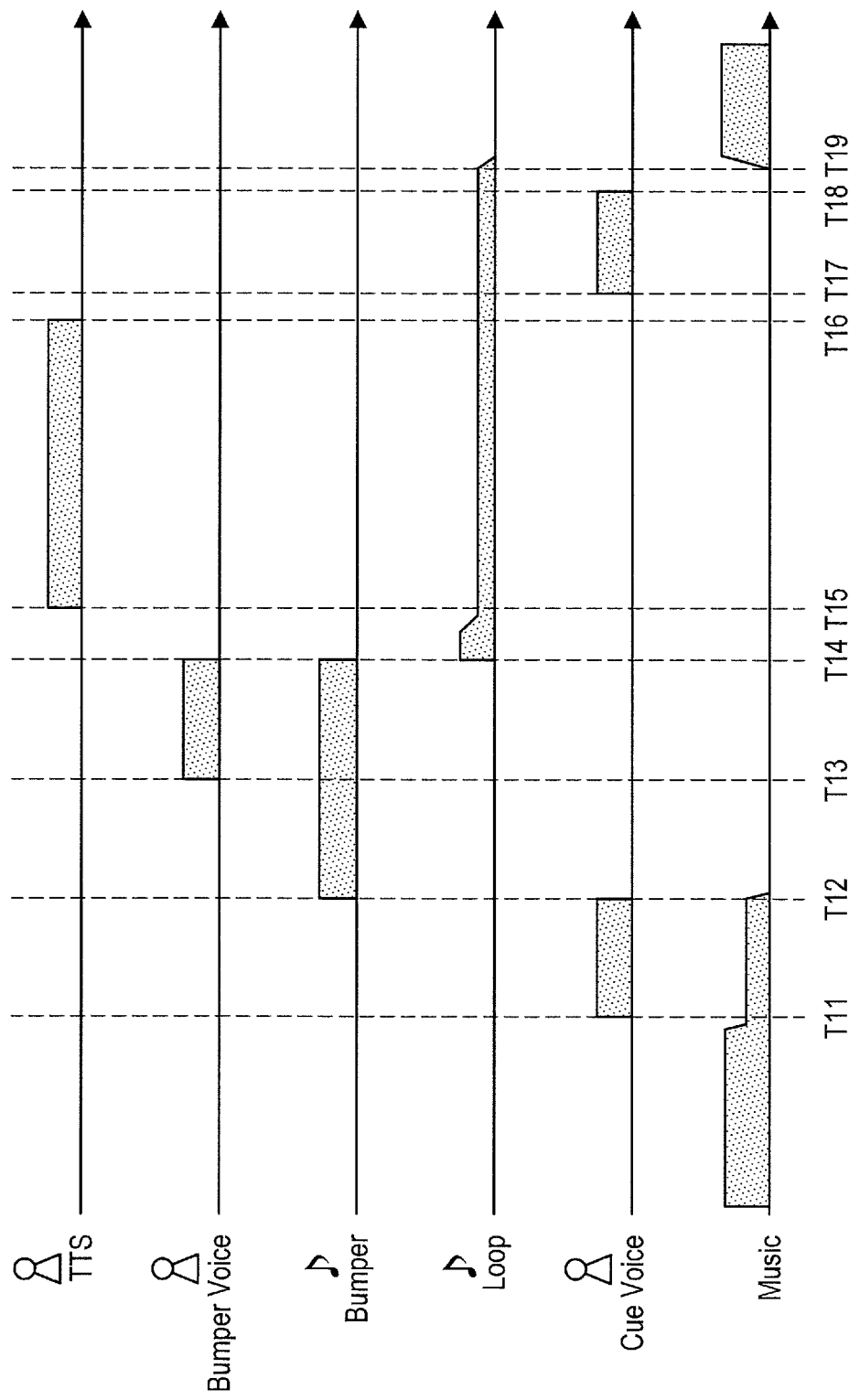

FIG. 7

| INPUT VOICE / REPRODUCTION STATE | Start XXX | Stop | Next |
|---|---|---|---|
| Music | REPRODUCE DESIGNATED CORNER MAIN PART | STOP Music REPRODUCTION | REPRODUCE NEXT MUSIC |
| Cue Voice (AT TIME OF START) | IMMEDIATELY END AND REPRODUCE DESIGNATED CORNER MAIN PART | IMMEDIATELY END | IMMEDIATELY REPRODUCE CORNER MAIN PART |
| Bumper / Bumper Voice | IMMEDIATELY END AND REPRODUCE DESIGNATED CORNER MAIN PART | IMMEDIATELY END | IMMEDIATELY REPRODUCE CORNER MAIN PART |
| CORNER MAIN PART BEING REPRODUCED | SPEECH DESIGNATING ANOTHER CORNER: IMMEDIATELY END AND REPRODUCE DESIGNATED CORNER MAIN PART SPEECH DESIGNATING INFORMATION REGARDING CURRENT CORNER: CONTINUE Loop REPRODUCTION AND START READING ALOUD DESIGNATED INFORMATION | IMMEDIATELY END | CONTINUOUSLY REPRODUCE CORNER MAIN PART (FOLLOW INDIVIDUAL SPECIFICATION OF CORNER) |
| Cue Voice (AT TIME OF END) | IMMEDIATELY END AND REPRODUCE DESIGNATED CORNER MAIN PART | IMMEDIATELY END | IMMEDIATELY END |

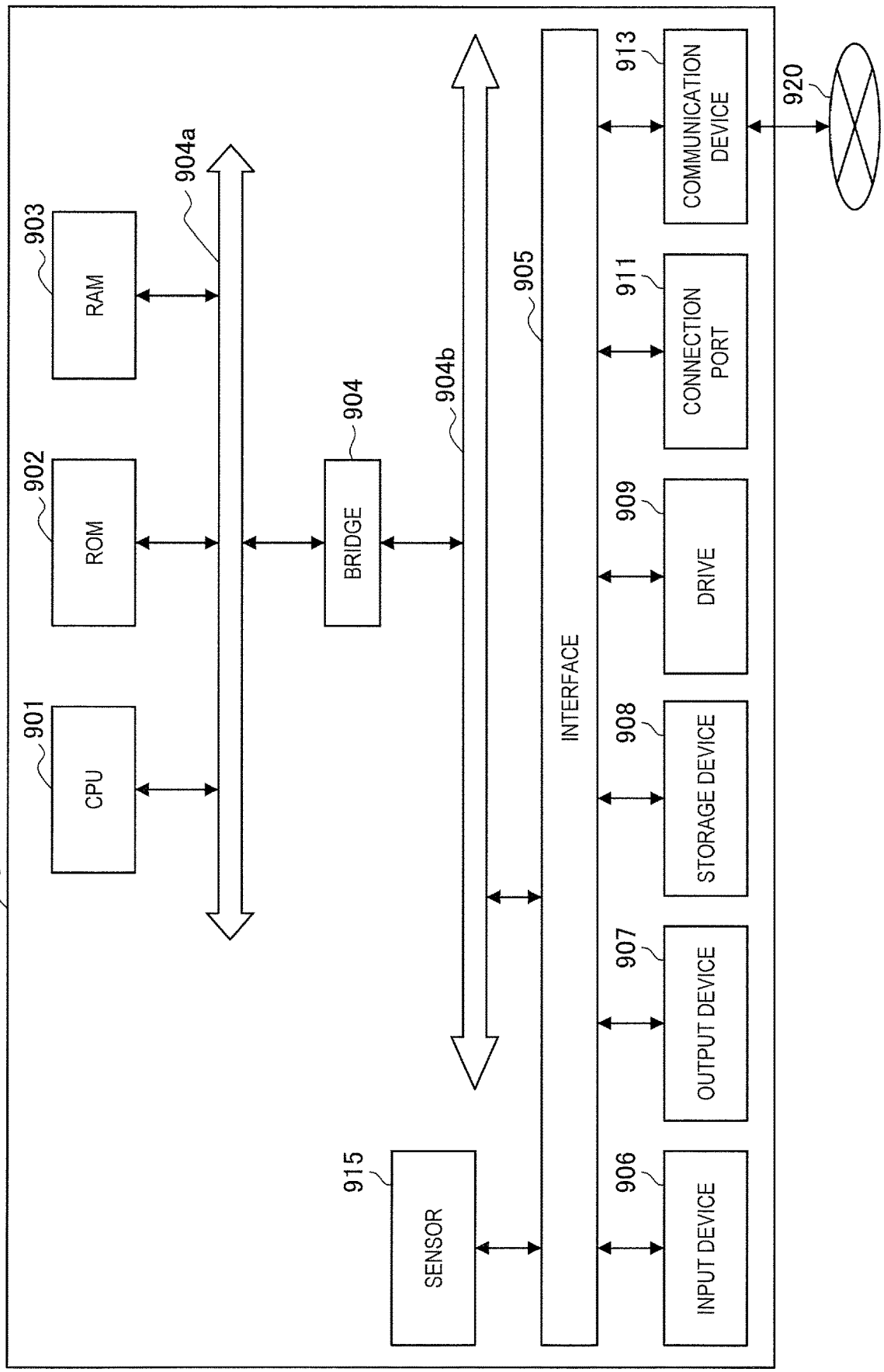

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/024782 (filed on Jul. 6, 2017) under 35 U.S.C. § 371, which claims priority to Japanese Patent Application No. 2016-161545 (filed on Aug. 19, 2016), which are all hereby incorporated by reference in their entirety.

TECHNICAL FIELD

The present disclosure relates to an information processing apparatus, an information processing method, and a program.

BACKGROUND ART

In recent years, along with the development of speech synthesis technology, various types of voice-based information provision have become possible. For example, Patent Literature 1 described below discloses a technology of implementing information provision like a radio program, using speech synthesis, by performing a voice output on the basis of an output timing corresponding to a theme. In the technology described in Patent Literature 1, content prepared in advance and content dynamically acquired are consecutively provided in accordance with output timings.

CITATION LIST

Patent Literature

Patent Literature 1: JP 2011-43710A

DISCLOSURE OF INVENTION

Technical Problem

In a technology in which contents are consecutively provided as in Patent Literature 1 described above, when an input of a user is to be received, there is a possibility that it becomes difficult to perform an appropriate output (response) for the input of the user. For example, in a case where an input targeted on content is performed, there is a possibility that target content intended by the user in the input and target content in a response become different.

In view of the foregoing, the present disclosure proposes an information processing apparatus, an information processing method, and a program that are novel and improved, and can perform an output more appropriate for an input of a user.

Solution to Problem

According to the present disclosure, there is provided an information processing apparatus including: an information acquisition unit configured to acquire input information of a user that includes a time lag between an input start and an input end, in a mode in which a plurality of contents are consecutively provided via at least one non-content period; and an output control unit configured, in a case where the input information is acquired in a content period in which first content or second content to be provided at a time later than the first content is being provided, to cause an output unit to output first output information on the basis of the input information, the first content and the second content being included in the plurality of contents, and in a case where the input information is acquired in the non-content period existing between the first content and the second content, to cause the output unit to output second output information different from the first output information, on the basis of the input information.

In addition, according to the present disclosure, there is provided an information processing method including: acquiring, by a processor, input information of a user that includes a time lag between an input start and an input end, in a mode in which a plurality of contents are consecutively provided via at least one non-content period; and in a case where the input information is acquired in a content period in which first content or second content to be provided at a time later than the first content is being provided, causing an output unit to output first Output information on the basis of the input information, the first content and the second content being included in the plurality of contents, and in a case where the input information is acquired in the non-content period existing between the first content and the second content, causing the output unit to output second output information different from the first output information, on the basis of the input information.

In addition, according to the present disclosure, there is provided a program for causing a computer to implement: a function of acquiring input information of a user that includes a time lag between an input start and an input end, in a mode in which a plurality of contents are consecutively provided via at least one non-content period; and a function of, in a case where the input information is acquired in a content period in which first content or second content to be provided at a time later than the first content is being provided, causing an output unit to output first output information on the basis of the input information, the first content and the second content being included in the plurality of contents, and in a case where the input information is acquired in the non-content period existing between the first content and the second content, causing the output unit to output second output information different from the first output information, on the basis of the input information.

Advantageous Effects of Invention

As described above, according to the present disclosure, an output more appropriate for an input of a user can be performed.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a table illustrating an example of a voice command to be recognized by an information processing apparatus 1 according to the embodiment.

FIG. 6 is a time chart diagram illustrating an example of a flow of a corner according to the embodiment corner in more detail.

FIG. 7 is a table illustrating an example of output control performed in a case where input information is acquired when a corner according to the embodiment is being provided.

FIG. 13 is an explanatory diagram illustrating a hardware configuration example.

MODE(S) FOR CARRYING OUT THE INVENTION

Figure 1:
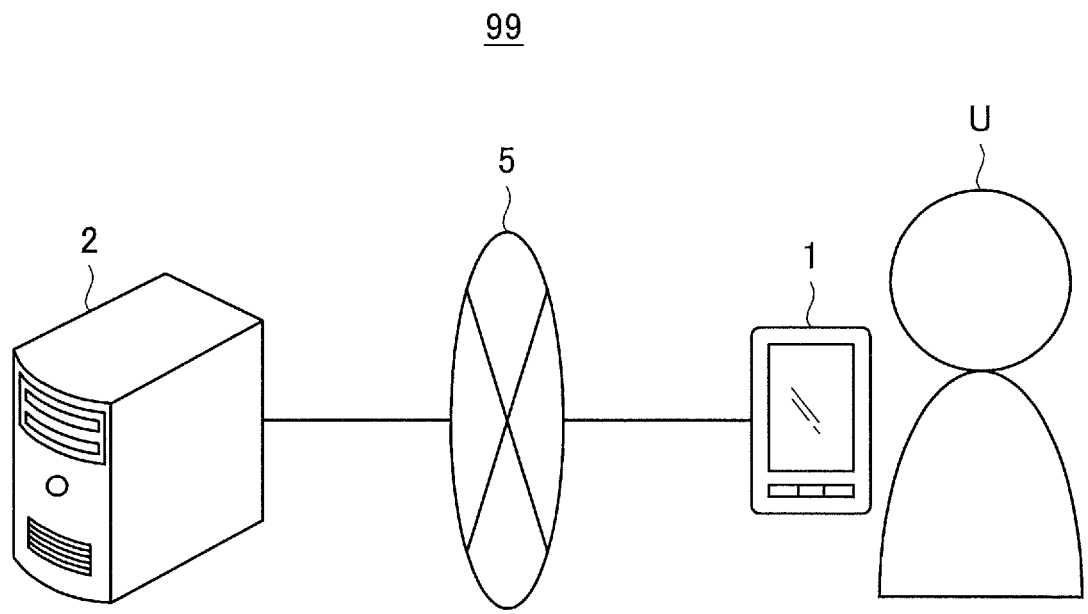
FIG. 1 is an explanatory diagram for describing a schematic configuration of an information processing system 99 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

<<1. Overview>>
<<2. Configuration>>
<<3. Operation>>
<3-1. Flow of process>
<3-2. Example of output control>
<<4. Hardware configuration example>>
<5. Conclusion>>

<<1. Overview>>

First of all, a schematic configuration of an information processing system according to an embodiment of the present disclosure will be described with reference to FIG. 1. FIG. 1 is an explanatory diagram for describing a schematic configuration of an information processing system 99 according to the present embodiment.

As illustrated in FIG. 1, the information processing system 99 according to the present embodiment includes an information processing apparatus 1 owned by a user U, a server 2, and a communication network 5. In addition, as illustrated in FIG. 1, the information processing apparatus 1 and the server 2 are connected to each other via the communication network 5.

The information processing apparatus 1 according to the present embodiment provides content to the user U, and in addition, receives an input of the user U. For example, the information processing apparatus 1 according to the present embodiment may provide content by a voice output, and in addition, receive an input of the user U by a voice input. Note that FIG. 1 illustrates an example in which the information processing apparatus 1 is a smartphone, but the information processing apparatus 1 is not limited to a smartphone. For example, the information processing apparatus 1 may be a personal computer (PC), a mobile phone, a tablet PC, a music player, a neckband-type device, or the like.

For example, the information processing apparatus 1 may recognize a voice command spoken by the user U, receive an input of the user U, and perform various types of processes that are based on the input of the user. FIG. 2 is a table illustrating an example of a voice command to be recognized by the information processing apparatus 1.

As illustrated in FIG. 2, a voice command to be recognized by the information processing apparatus 1 may be "Start", "Stop", "Next", or the like. In addition, a voice command to be recognized by the information processing apparatus 1 is not limited to the above-described examples, and may include a voice command similar to the above-described examples, and voice commands included in "Option" illustrated in FIG. 2.

In addition, in addition to the voice commands, the information processing apparatus 1 may recognize an object such as "Music", "Running", "Photo", "Video", "Song", and "Corner" that are illustrated in FIG. 2. By recognizing a combination of a voice command and an object, the information processing apparatus 1 can recognize various types of manipulations.

Figure 3:
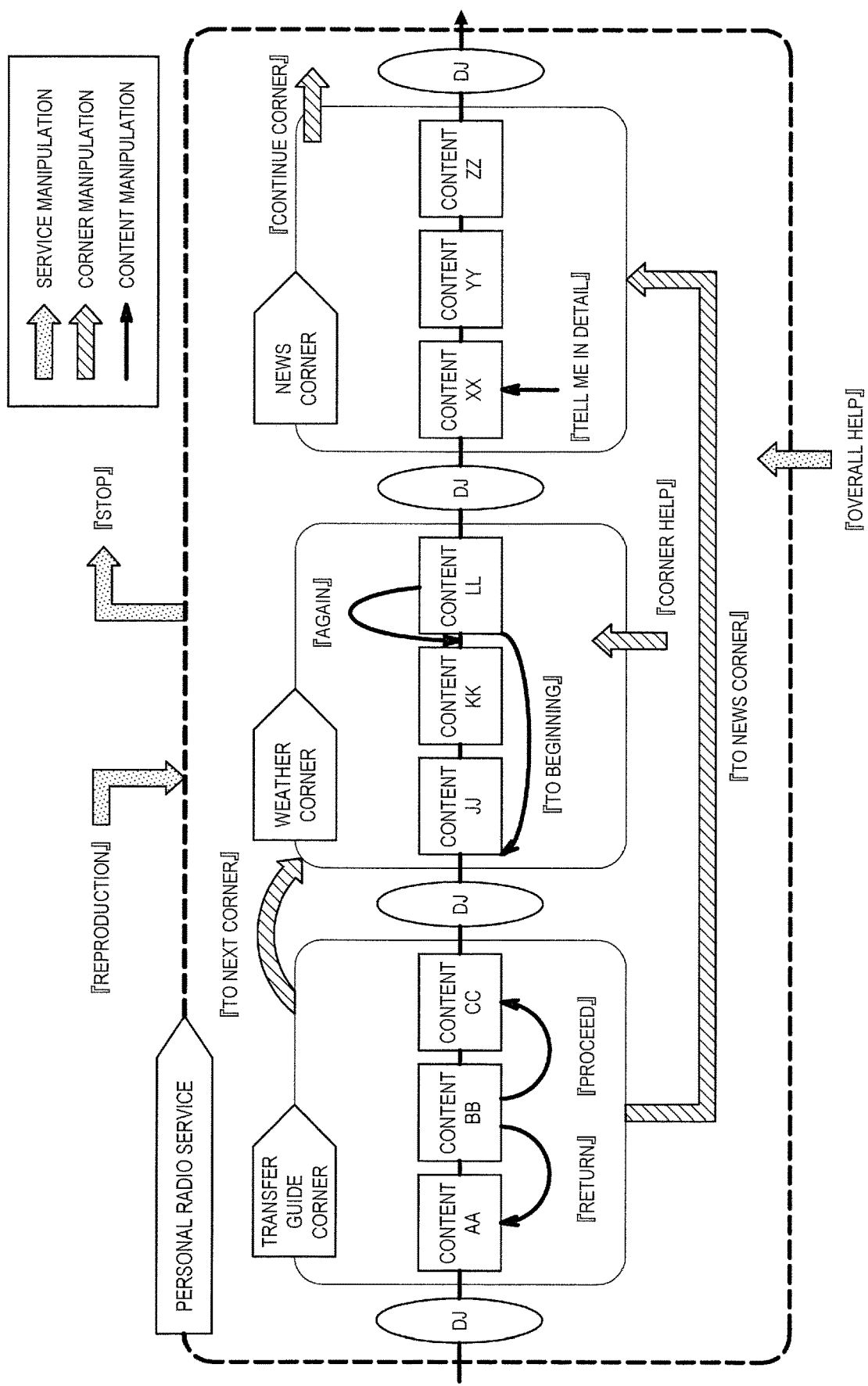
FIG. 3 is a conceptual diagram illustrating an example of a service provided by the information processing apparatus 1 according to the embodiment, and a manipulation performed by a voice input.

FIG. 3 is a conceptual diagram illustrating an example of a service provided by the information processing apparatus 1 according to the present embodiment, and a manipulation performed by a voice input. As illustrated in FIG. 3, the information processing apparatus 1 according to the present embodiment provides a radio program-like service (personal radio service) of providing information targeted for the user U, by a voice output.

The personal radio service provided by the information processing apparatus 1 includes a plurality of corners, and a voice output such as corner introduction (DJ in FIG. 3) performed by a radio disc jockey (DJ) is performed between the corners. In addition, each corner includes a plurality of contents classified into the same category (weather, news, etc.) corresponding to the corner. The contents may be consecutively provided via a non-content period in which content is not provided.

By acquiring input information of the user that is based on a combination of a voice command and an object as in the table illustrated in FIG. 2, and performing a process (e.g. voice output) on the basis of the input information, the information processing apparatus 1 can implement a service manipulation targeted on the entire service, a corner manipulation targeted on a corner, and a content manipulation targeted on content, as illustrated in FIG. 3.

In addition, the information processing apparatus 1 may perform a process on the basis of input information not including an object and including only a voice command. For example, the information processing apparatus 1 may perform a process in accordance with input information not including an object, and a condition to be described later. By this configuration, the user can perform a manipulation by a smaller amount of voice speech, and in addition, the user can perform a manipulation without memorizing various types of objects.

Referring back to FIG. 1, the description of the information processing system 99 will be continued. The server 2 illustrated in FIG. 1 is an information processing apparatus that provides the information processing apparatus 1 with various types of information via the communication network 5. For example, the server 2 may provide the information processing apparatus 1 with information for implementing the personal radio service described with reference to FIG. 3. For example, the server 2 may provide the information processing apparatus 1 with information regarding each corner illustrated in FIG. 3, information regarding each content, information regarding corner introduction performed by a radio DJ, and the like.

The communication network 5 is a wired or wireless transmission path of information to be transmitted from a device connected to the communication network 5. For example, the communication network 5 may include a public circuit network such as the Internet, a telephone circuit network, or a satellite communication network, various local area networks (LANs) including Ethernet (registered trademark), a wide area network (WAN), and the like. In addition, the communication network 5 may include a dedicated circuit network such as an internet protocol-virtual private network (IP-VPN).

The overview of the information processing system 99 according to the present embodiment has been described above. According to the information processing system 99 according to the present embodiment, a radio program-like service of providing information targeted for the user can be provided by a voice as described with reference to FIG. 3, for example, and it becomes possible for the user to perform various types of manipulations by a voice. In addition, because both of an input and an output (provision of a service) are performed by voices, it becomes possible for the user to receive a service and perform a manipulation concurrently with another work (while performing a work), Hereinafter, a detailed configuration of the information processing apparatus 1 for realizing such an effect will be described with reference to FIG. 4.

<<2. Configuration>>

Figure 4:
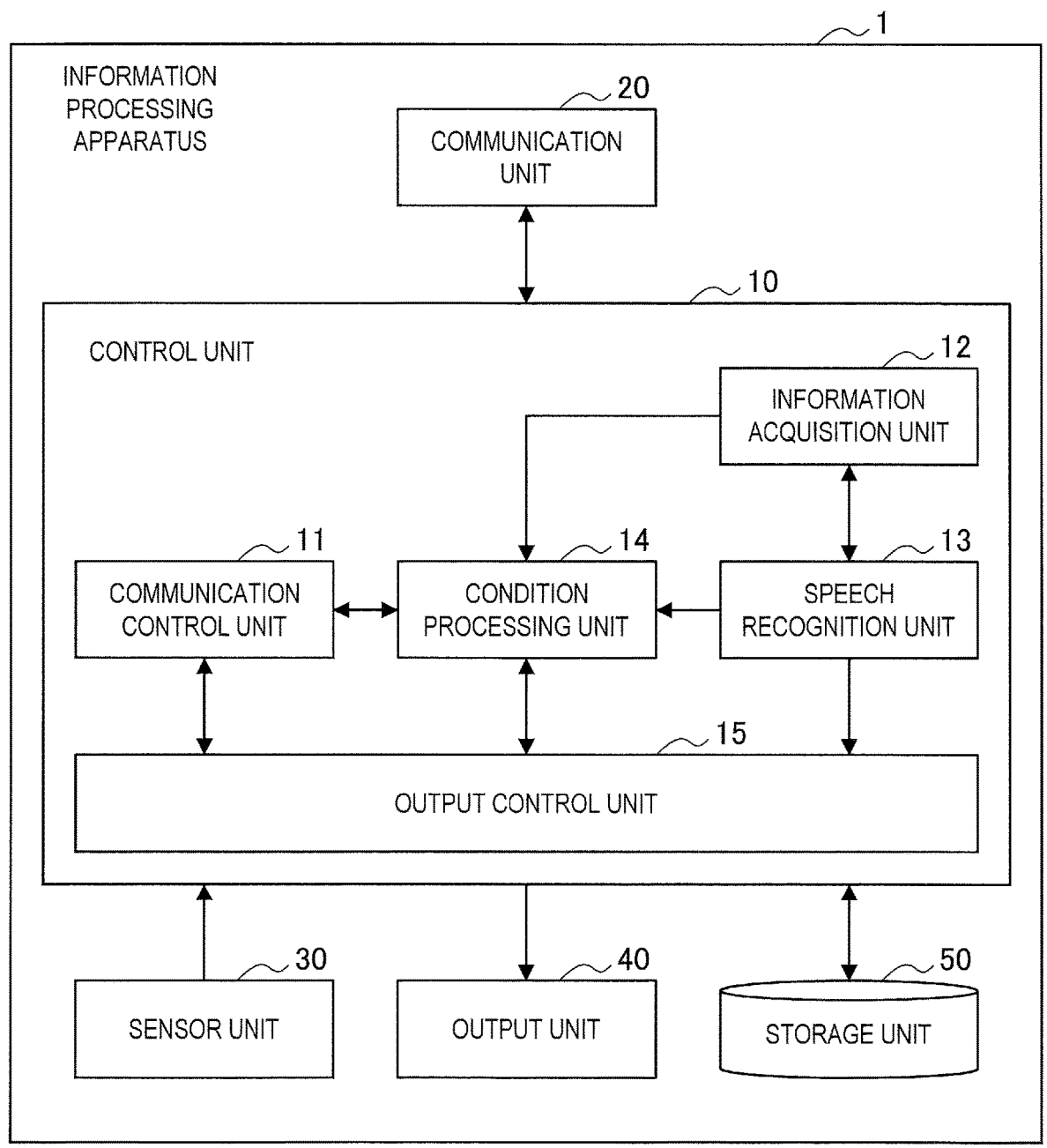
FIG. 4 is a block diagram illustrating a configuration example of the information processing apparatus 1 included in the information processing system 99 according to the embodiment.

FIG. 4 is a block diagram illustrating a configuration example of the information processing apparatus 1 included in the information processing system 99 according to the present embodiment. As illustrated in FIG. 4, the information processing apparatus 1 according to the present embodiment is an information processing apparatus including a control unit 10, a communication unit 20, a sensor unit 30, an output unit 40, and a storage unit 50. Note that the output unit 40 may be provided in an external device of the information processing apparatus 1.

The control unit 10 controls each configuration of the information processing apparatus 1. In addition, as illustrated in FIG. 4, the control unit 10 according to the present embodiment also functions as a communication control unit 11, an information acquisition unit 12, a speech recognition unit 13, a condition processing unit 14, and an output control unit 15.

The communication control unit 11 controls communication performed by the communication unit 20. For example, the communication control unit 11 controls the communication unit 20 to receive information such as information regarding each corner, information regarding each content, and information regarding corner introduction performed by a radio DJ, from the server 2 described with reference to FIG. 1.

The information acquisition unit 12 acquires input information of the user that is based on sensing of the sensor unit 30. For example, the information acquisition unit 12 according to the present embodiment may acquire, as input information, a voice signal generated by a microphone included in the sensor unit 30 to be described later, by sensing a voice of the user.

The information acquisition unit 12 according to the present embodiment acquires input information including a time lag between an input start and an input end, as in a voice signal. In addition, the information acquisition unit 12 provides the condition processing unit 14 to be described later, with acquisition time information related to an acquisition time of the input information.

For example, the acquisition time information may include either or both of a time of an input start and a time of an input end. The information acquisition unit 12 identifies the time of an input start and the time of an input end in the following manner, for example.

Note that, in the present embodiment, a time at which the user has started speech of a voice related to the input information may be identified as a time of an input start. In addition, a time of an input start may be estimated from a time of an input end on the basis of a recognition result (e.g. length of a recognized speech text) obtained by the speech recognition unit 13 to be described later. In addition, a time at which predetermined voice input start words (e.g. "Hello Agent", etc.) have been recognized by the speech recognition unit 13 may be identified as a time of an input start. According to this configuration, a time of a voice input start can be identified even in a case where it is difficult to detect a voice input start due to surrounding noise or the like.

In addition, in the present embodiment, a time at which speech of a voice related to the input information has ended may be identified as a time of an input end. In addition, a time at which a speech text has been recognized by the speech recognition unit 13 to be described later may be identified as a time of an input end.

The speech recognition unit 13 performs a recognition process related to a voice signal acquired by the information acquisition unit 12 as input information. For example, the speech recognition unit 13 converts a voice signal into a character string, and acquires a speech text. In addition, the speech recognition unit 13 may determine whether or not the acquired speech text corresponds to a voice command or an object that has been described with reference to FIG. 2, or predetermined voice input start words. In addition, the speech recognition unit 13 may recognize (identify) a user on the basis of a feature of a voice.

The condition processing unit 14 performs a recognition process related to a condition, and a determination process corresponding to a condition. Various types of conditions are handled by the condition processing unit 14, and for example, the conditions may include the type of information output by the information processing apparatus 1, an acquisition timing (acquisition time) of input information, context information, a state of an application related to the provision of content, and the like.

For example, the type of information output by the information processing apparatus 1 includes music, corner introduction performed by a radio DJ that has been described with reference to FIG. 3, a corner, and the like.

In addition, the context information includes, for example, time slot information, content information, behavior information of the user, environment information regarding a surrounding environment of the user, location information regarding a location where the user exists, and the like. For example, the condition processing unit 14 may perform a recognition process on a sensing result obtained by the sensor unit 30 to be described later, and acquire the above-described context information.

The condition processing unit 14 provides the output control unit 15 with a result of a determination process corresponding to a condition. Note that the details of the determination corresponding to a condition that is performed by the condition processing unit 14 will be described later together with an output control example corresponding to a determination result that is performed by the output control unit 15.

The output control unit 15 controls the output unit 40 to be described later, to output various types of output information. The output control unit 15 according to the present embodiment controls a voice output related to a personal radio service as described with reference to FIG. 3, for example. Hereinafter, an example in which output information according to the present embodiment is information output by a voice will be described as an example.

For example, by causing the output unit 40 to output, as output information, a plurality of contents in each corner as described with reference to FIG. 3, the output control unit 15 provides the contents to the user. For example, in a mode in which each corner in FIG. 3 is provided, the output control unit 15 consecutively provides a plurality of contents via at least one non-content period.

Note that the output control unit 15 may perform speech synthesis on the basis of text information stored in the storage unit 50 or text information acquired from the server 2, and cause the voice to be output. In addition, the output control unit 15 may cause a voice to be output on the basis of voice data (voice signal) stored in the storage unit 50 or voice data acquired from the server 2.

In addition, the output control unit 15 may cause the output unit 40 to output output information on the basis of input information acquired by the information acquisition unit 12. For example, the output control unit 15 performs a response to an input of the user by causing output information corresponding to a voice command, an object, or the like that has been recognized by the speech recognition unit 13 on the basis of input information, to be output. In addition, the output control unit 15 may cause output information to be output in accordance with a result of a determination process (determination result) corresponding to a condition that is provided by the condition processing unit 14. By this configuration, it becomes possible to perform a more appropriate output even in the case of speech with a small amount of input of the user (e.g. only voice command).

For example, the output control unit 15 may control an output in accordance with an acquisition time (acquisition timing) of input information, and a result of determination that is based on a provision status of content. The above-described determination is performed by the condition processing unit 14, for example. In addition, an acquisition time used in the determination may be a time of an input end, for example.

For example, in a case where input information is acquired in a content period in which content is provided, the output control unit 15 may cause the output unit 40 to output first output information on the basis of the input information, and in a case where input information is acquired in a non-content period existing between content and another content, the output control unit 15 may cause the output unit 40 to output second output information different from the first output information, on the basis of the input information.

In addition, the output control unit 15 may identify target content related to input information of the user, in accordance with acquisition time information, and cause output information related to the target content, to be output. According to this configuration, the user can receive provision of information related to target content, without speaking an object for identifying target content.

For example, first content may be identified as target content of second output information to be output in a case where input information is acquired in a non-content period existing between the first content and second content to be provided at a time later than the first content. According to this configuration, the user can perform a voice input targeted on content (first content) that has been lastly provided, without speaking an object for identifying target content.

In addition, when a plurality of non-content periods exist between first content and second content, the output control unit 15 may cause output information related to the first content, to be output in a case where input information is acquired in a non-content period existing immediately after the first content. In addition, the Output control unit 15 may cause output information related to the second content, to be output in a case where input information is acquired in a non-content period existing immediately before the second content.

In addition, the output control unit 15 may cause the output unit 40 to output input request output information prompting the user to perform an input for identifying target content. According to this configuration, it becomes possible to ask the user for an input for identifying target content, and dialogically identify target content in a case where it is difficult to identify target content, for example.

In addition, the output control unit 15 may cause the above-described input request output information to be output in a case where input information is acquired in a predetermined period from a provision start of second content in a content period in which the second content is being provided. For example, it is considered that the user receives provision of first content and starts speech (input) with intent to perform an input targeted on the first content, but provision of second content is started at a time point at which the speech ends. In this case, it can be difficult to identify target content only by an acquisition time of input information, but according to the above-described configuration, it becomes possible to dialogically identify target content.

In addition, for example, when three or more non-content periods exist between first content and second content, the output control unit 15 may cause input request output information to be output in a case where input information is acquired in a non-content period existing between a non-content period existing immediately after the first content, and a non-content period existing immediately before the second content.

In addition, the output control unit 15 may identify target content in accordance with a time of an input start and a time of an input end. According to this configuration, it is possible to identify target content intended by the user, more accurately, and it becomes possible to perform a more appropriate output.

Note that specific examples of the above-described identification of target content and output control related to target content will described later with reference to FIGS. 8 to 12.

Note that the output control performed by the output control unit 15 is not limited to the above-described example. The output control unit 15 may cause the output unit 40 to output output information corresponding to context information, or the output control unit 15 may control an output performed by the output unit 40, in accordance with a state of an application related to the provision of content.

A specific example of the above-described output control performed by the output control unit 15 will be described later.

The communication unit 20 is a communication interface that mediates communication performed with another device. The communication unit 20 supports an arbitrary radio communication protocol or a wired communication protocol, and establishes communication connection with the server 2 via the communication network 5 described with reference to FIG. 1, for example. In addition, in accordance with the control of the communication control unit 11, the communication unit 20 receives information from the server 2 or transmits information to the server 2.

The sensor unit 30 senses a surrounding situation of the information processing apparatus 1. The sensor unit 30 according to the present embodiment includes at least a microphone that generates a voice signal (input information) by sensing a voice of the user. In addition, the sensor unit 30 may include various kinds of sensors such as an acceleration sensor, a gyro sensor, a geomagnetic sensor, a light sensor, a sound sensor, a distance measuring sensor, and a force sensor.

The output unit 40 performs an output in accordance with the control of the output control unit 15. The output unit 40 according to the present embodiment includes a voice output device that can output a voice, such as a speaker and headphones, for example. In addition, the output unit 40 may include a display, a light-emitting diode (LED), and the like.

The storage unit 50 stores programs and parameters for the configurations of the information processing apparatus 1 functioning.

The configuration of the information processing apparatus 1 according to the present embodiment has been specifically described above. Note that the configuration of the information processing apparatus 1 illustrated in FIG. 4 is an example, and the present embodiment is not limited to this. In addition, the information processing apparatus 1 may further include a touch panel display, a physical button, or the like as a user interface. In addition, each function of the control unit 10 according to the present embodiment may be included in another information processing apparatus (e.g. the server 2 in FIG. 1, etc. connected via the communication network 5.

<<3. Operation>>

Subsequently, an operation of the information processing apparatus 1 according to the present embodiment will be described. First of all, with reference to FIG. 5, a flow of an output (response) process for a user input that is performed by the information processing apparatus 1 according to the present embodiment will be described, and then, an example of output control for the input of the user will be specifically described.

<3-1. Flow of Process>

Figure 5:
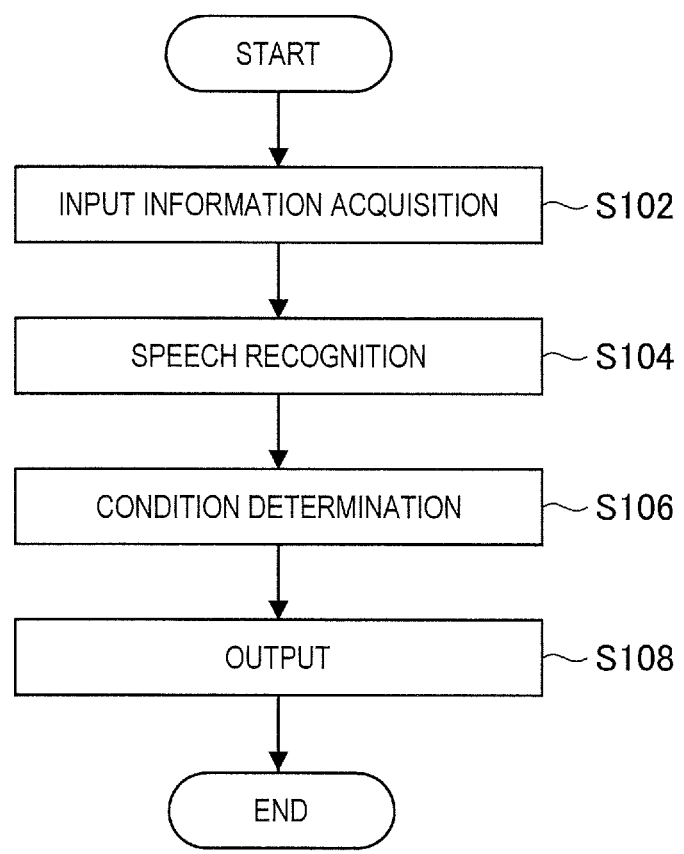
FIG. 5 is a flow chart diagram for describing a flow of an output process for a user input that is performed by the information processing apparatus 1 according to the embodiment.

FIG. 5 is a flow chart diagram for describing a flow of an output process for a user input that is performed by the information processing apparatus 1 according to the present embodiment.

As illustrated in FIG. 5, first of all, the information acquisition unit 12 acquires a voice signal of the user from the sensor unit 30 as input information (S102), Subsequently, the speech recognition unit 13 performs speech recognition on the basis of the acquired input information (voice signal) (S104).

Subsequently, the condition processing unit 14 performs determination corresponding to various types of conditions (S106). Subsequently, the output control unit 15 controls an output of the output unit 40 on the basis of a speech recognition result in step S104 and a determination result in step S106 (S108).

The flow of the process according to the present embodiment has been described above. Subsequently, several specific examples of output control corresponding to condition determination according to the present embodiment will be described.

<3-2. Example of Output Control>

(Output Control Corresponding to Reproduction State)

FIG. 6 is a time chart diagram illustrating an example of a flow of a corner described with reference to FIG. 3, in more detail. In FIG. 6, a vertical axis indicates volume of a sound and a horizontal axis indicates a time.

"Music" illustrated in FIG. 6 is music to be selectively reproduced by the user, for example, and is reproduced by a music player function, for example. In addition, "Cue Voice" illustrated in FIG. 6 corresponds to a DJ illustrated in FIG. 3, and for example, corner introduction at the time of a corner start and appreciative words for a reporter (TTS) at the time of a corner end are reproduced. "Loop" illustrated in FIG. 6 is music (back-ground music: BGM) individually set for each corner. In addition, "Bumper" and "Bumper Voice" illustrated in FIG. 6 are a jingle sound unique to a corner and a greeting of a reporter, respectively. In addition, "Text To Speech (TTS)" illustrated in FIG. 6 is reading aloud performed by a reporter using speech synthesis. Note that, hereinafter, a time in which TTS is being reproduced will be sometimes referred to as a corner main part.

As illustrated in FIG. 6, when the reproduction of Cue Voice (at the time of a corner start) is started at a time T11 in a state in which Music is being reproduced, reproduction sound volume of Music is lowered. Subsequently, together with an end of the reproduction of Cue Voice at a time T12, reproduction sound volume of Music approaches 0, and the reproduction of Bumper is started. Subsequently, the reproduction of Bumper Voice is started at a time T13. Subsequently, the reproduction of Bumper and Bumper Voice ends at a time T15, and the reproduction of Loop is started. In addition, when the reproduction of TTS is started at the time T15, reproduction sound volume of Loop is lowered. In addition, the reproduction of TTS ends at a time T16. A period between the time T15 and the time T16 corresponds to a corner main part. Subsequently, the reproduction of Cue Voice (at the time of a corner end) is started at a time T17 and ends at a time T18. Together with reproduction sound volume of Loop approaching 0 at a time T19, the reproduction of Music is restarted.

FIG. 7 is a table illustrating an example of output control performed in a case where input information is acquired when a corner described with reference to FIG. 6 is being provided. As illustrated in FIG. 7, output control corresponding to a reproduction state at a time at which input information is acquired, and an input voice is performed. Note that, in the example illustrated in FIG. 7, a voice command Start is input in combination with a corner name or an object XXX designating information in a corner.

(Output Control Corresponding to Input Timing)

Figure 8:
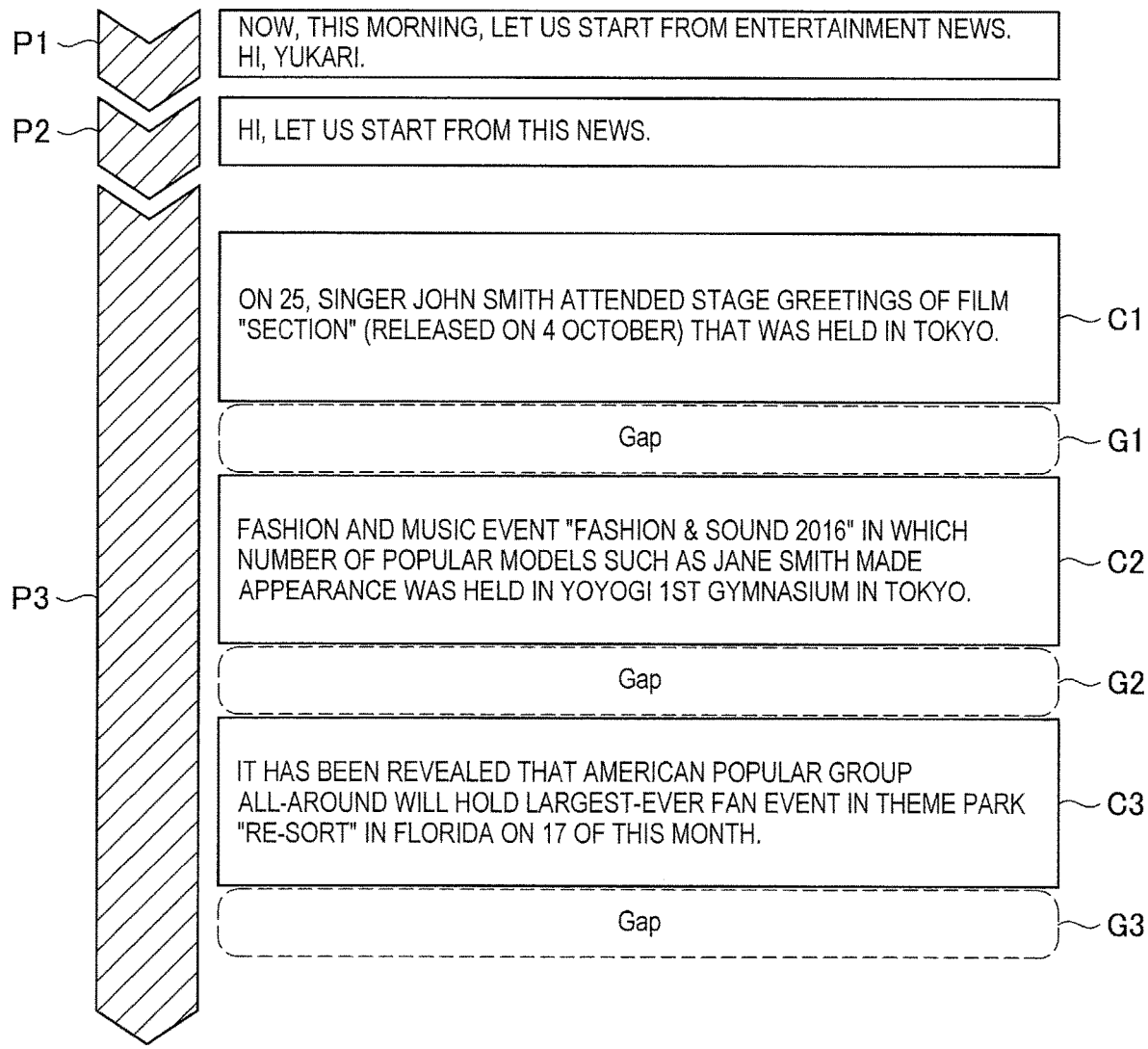
FIG. 8 is an explanatory diagram for describing a specific example of a corner according to the embodiment.

FIG. 8 is an explanatory diagram for describing a specific example of a corner according to the present embodiment. FIG. 8 illustrates an example of a news corner according to the present embodiment. In the news corner, for example, after corner introduction performed by a DJ (P1) and a greeting of a reporter (P2), a plurality of contents C1 to C3 are read aloud by speech synthesis (P3).

Here, in a case where the user desires to know content in more detail, by the user performing a voice input such as "tell me in detail" and "in more detail", more detailed information is output. Here, for facilitating identification of target content targeted by the user in an input of the user, in the corner according to the present embodiment, as illustrated in FIG. 8, imps G1 to G3 in which content is not provided exist between content and content. Note that, in the gaps G1 to G3, Loop (BGM) described in FIG. 6 may be reproduced.

Figure 9:
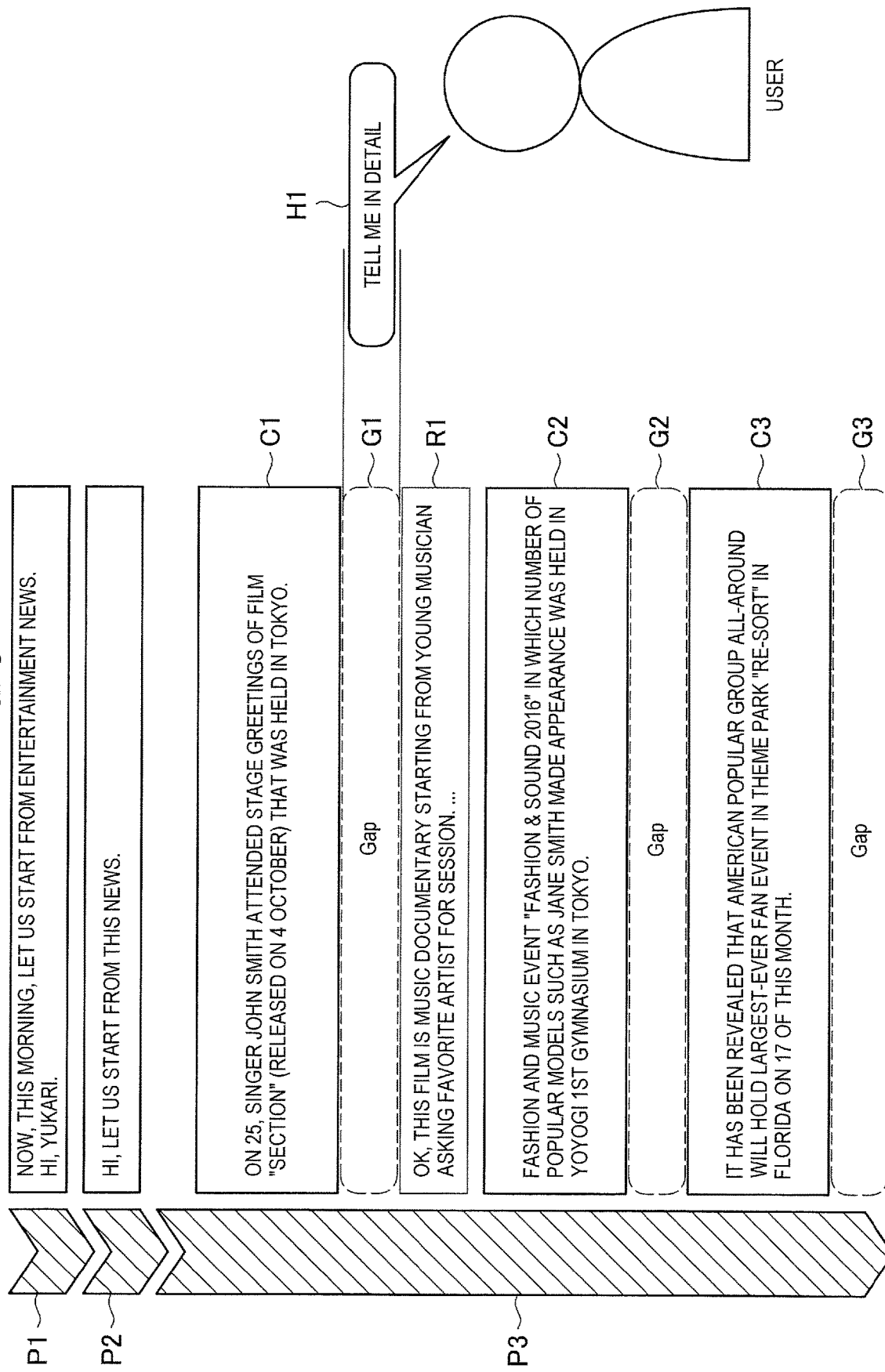
FIG. 9 is an explanatory diagram for describing an example of an input of a user in a news corner according to the embodiment.

FIG. 9 is an explanatory diagram for describing an example of an input of the user in the news corner. For example, as illustrated in FIG. 9, in a case where the user performs speech H1 saying that "tell me in detail" in the period of the gap G1, the user is considered to intend the content C1 lastly output (provided), as target content. Thus, in the example illustrated in FIG. 9, the output control unit 15 according to the present embodiment causes more detailed output information RI that regards the content C1 as target content, to be output.

In addition, in a case where target content is identified, the output control unit 15 may cause output information indicating the target content, to be output, and then, cause more detailed output information related to the target content, to be output.

Figure 10:
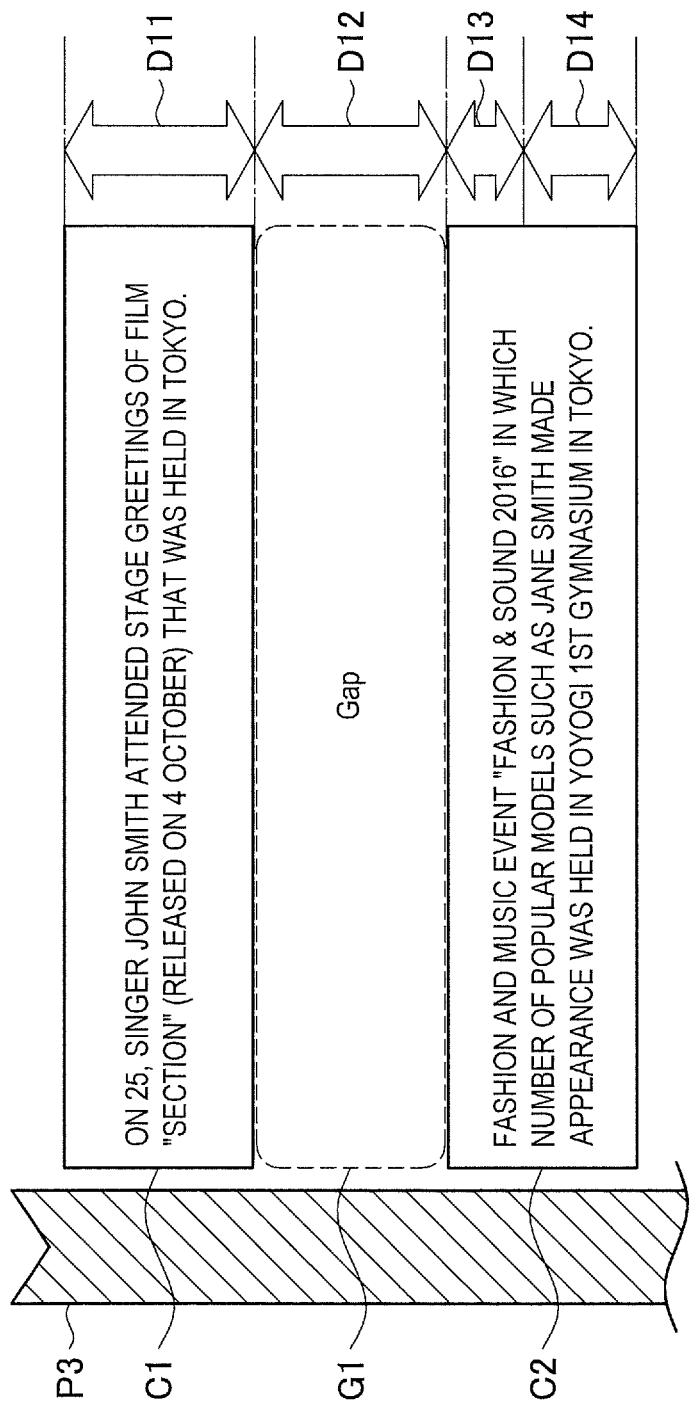
FIG. 10 is an explanatory diagram for describing a specific example of identification of target content according to the embodiment.

FIG. 10 is an explanatory diagram for describing a specific example of identification of target content. Similarly to the example in FIG. 8, a gap G1 in which content is not provided exists between content C1 (first content) and content C2 (second content) that are illustrated in FIG. 10.

For example, in a case where input information of the user is acquired in a period D11 in which the content C1 is provided, the output control unit 15 may identify the content C1 as target content. In this case, the output control unit 15 may cause output information indicating the target content, to be output by saying that "this article will be explained in more detail", and then, cause more detailed output information related to the content C1, to be output.

In addition, in a case where input information of the user is acquired in a non-content period D12 corresponding to the gap G1 in which content is not provided, the output control unit 15 may identify the content C1 being content output immediately before the non-content period D12, as target content. In this case, the output control unit 15 may cause output information indicating the target content, to be output by saying that "the previous article will be explained in more detail", and then, cause more detailed output information related to the content C1, to be output.

In addition, in a case where input information of the user is acquired in a predetermined period D13 from when the content C2 is provided, in a period in which the content C2 is being provided, the output control unit 15 may cause input request output information prompting the user to perform an input for identifying target content, to be output by saying that "the previous article? or the current article?". By this configuration, even in a case where it is difficult to identify target content, target content can be dialogically identified. Note that, because the period D13 is an auxiliary period of the non-content period D12, the period D13 is preferably shorter than the non-content period D12.

In addition, in a case where input information of the user is acquired in a period D14 following the period D13, in the period in which the content C2 is being provided, the output control unit 15 may identify the content C2 as target content. In this case, the output control unit 15 may cause output information indicating the target content, to be output by saying that "this article will be explained in more detail", and then, cause more detailed output information related to the content C2, to be output.

Figure 11:
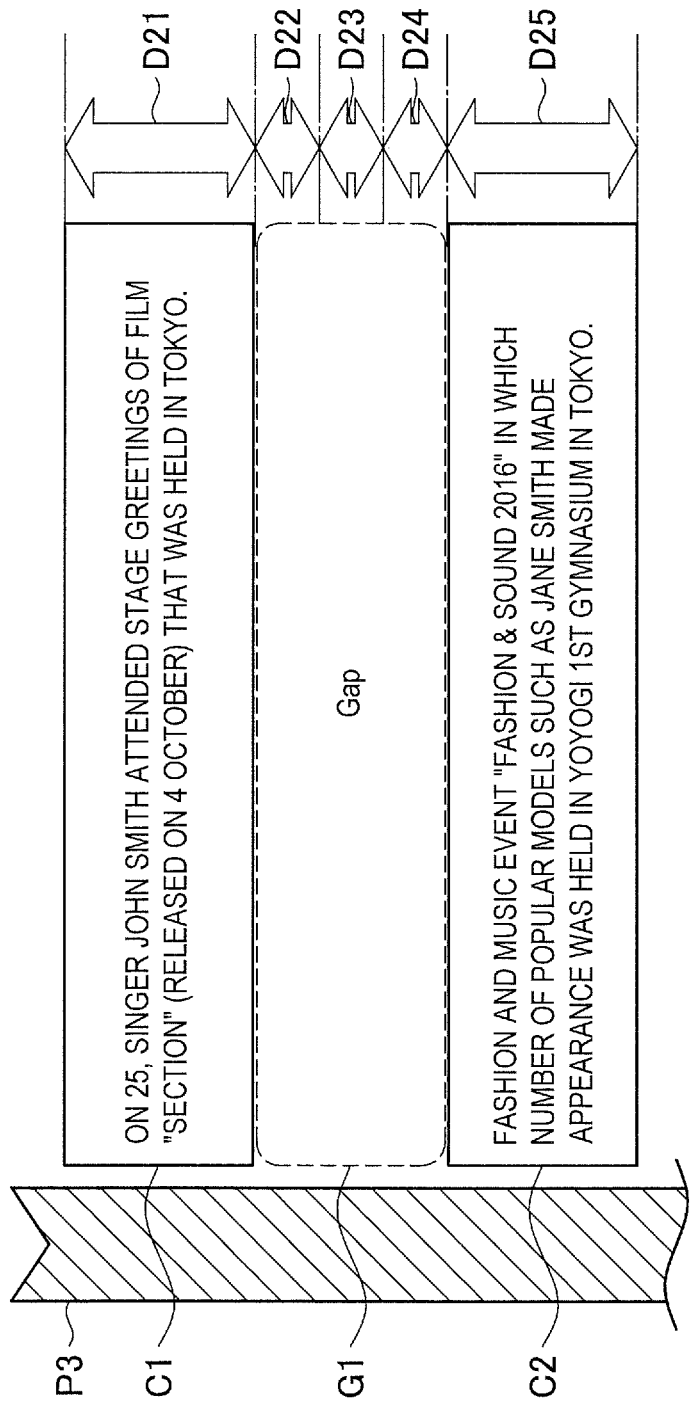
FIG. 11 is an explanatory diagram for describing another specific example of identification of target content according to the embodiment.

FIG. 11 is an explanatory diagram for describing another specific example of identification of target content. In the example illustrated in FIG. 11, a gap G1 is segmentalized into three non-content periods D22, D23, and D24.

For example, in a case where input information of the user is acquired in a period D21 in which content C1 is provided, the output control unit 15 may identify the content C1 as target content. In this case, the output control unit 15 may cause output information indicating the target content, to be output by saying that "this article will be explained in more detail", and then, cause more detailed output information related to the content C1, to be output.

In addition, in a case where input information of the user is acquired in the non-content period D22 existing immediately after the content C1, the output control unit 15 may identify the content C1 as target content. In this case, the output control unit 15 may cause output information indicating the target content, to be output by saying that "the previous article will be explained in more detail", and then, cause more detailed output information related to the content C1, to be output.

In addition, in a case where input information of the user is acquired in the non-content period D23 existing between the non-content period D22 and the non-content period D24, the output control unit 15 may cause input request output information prompting the user to perform an input for identifying target content, to be output by saying that "the previous article? or the current article?".

In addition, in a case where input information of the user is acquired the non-content period D24 existing immediately before the content C2, the output control unit 15 may identify the content C2 as target content. In this case, the output control unit 15 may cause output information indicating the target content, to be output by saying that "the next article will be explained in more detail", and then, cause more detailed output information related to the content C2, to be output.

In addition, in a case where input information of the user is acquired in a period D25 in which the content C2 is provided, the output control unit 15 may identify the content C2 as target content. In this case, the output control unit 15 may cause output information indicating the target content, to be output by saying that "this article will be explained in more detail", and then, cause more detailed output information related to the content C2, to be output.

The output control described with reference to FIG. 11 is effective in a case where the user preliminarily recognizes the overview or order of contents to be provided, for example. For example, the overview or order of contents may be displayed on a display included in the output unit 40.

Figure 12:
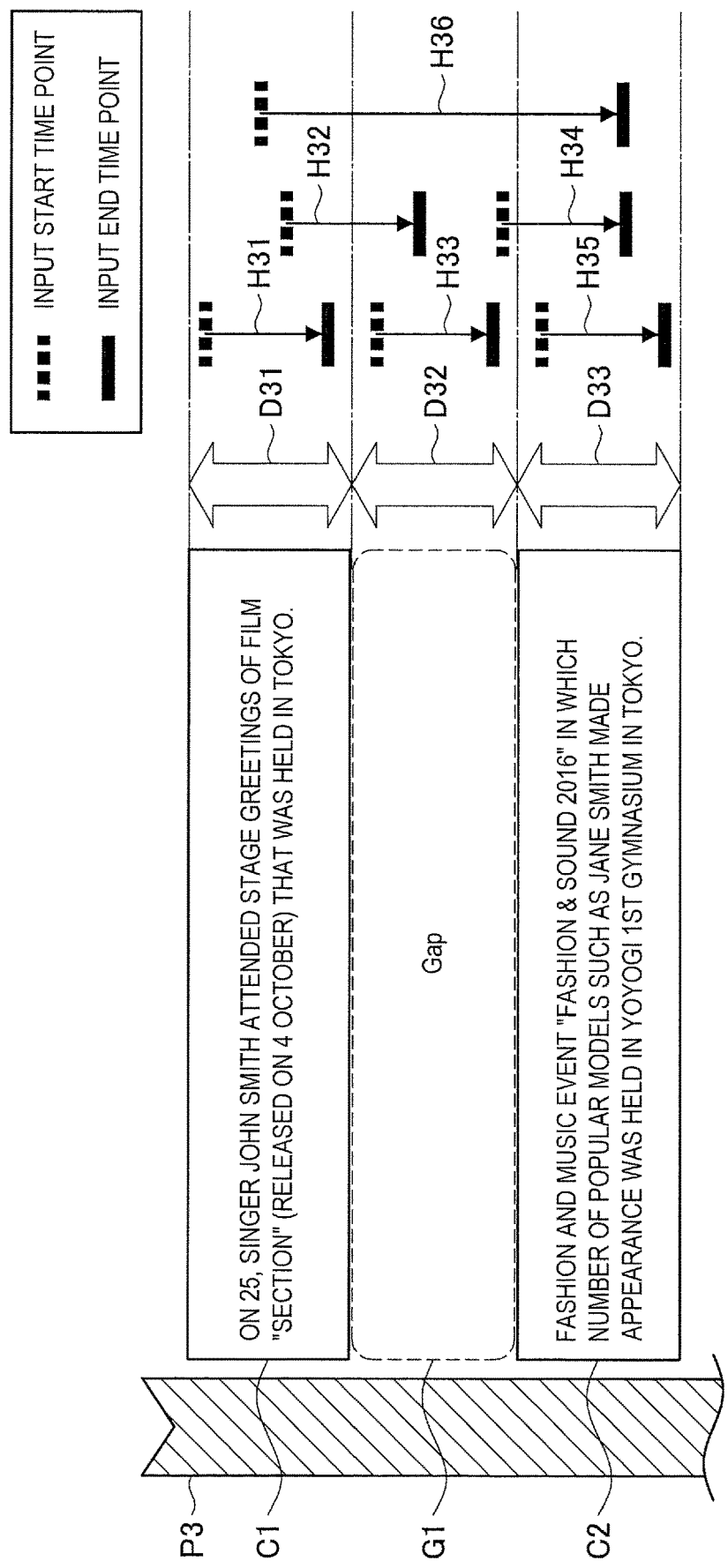
FIG. 12 is an explanatory diagram for describing another specific example of identification of target content according to the embodiment.

FIG. 12 is an explanatory diagram for describing another specific example of identification of target content. In the example illustrated in FIG. 12, target content is identified in accordance with a time of an input start time point and a time of an input end time point.

For example, in a case where a start time and an end time of an input are included in the same content period (content period D31 or content period D33) as in input information H31 or H35 illustrated in FIG. 12, the output control unit 15 may identify content provided in the period, as target content. In this case, the output control unit 15 may cause output information indicating the target content, to be output by saying that "this article will be explained in more detail", and then, cause more detailed output information related to the content, to be output.

In addition, in a case where a start time of an input is included in the content period D31 and an end time of the input is included in a non-content period D32, as in input information H32, the output control unit 15 may identify the content C1 provided at the start time of the input, as target content. In this case, the output control unit 15 may cause output information indicating the target content, to be output by saying that "the previous article will be explained in more detail", and then, cause more detailed output information related to the content C1, to be output.

In addition, in a case where a start time and an end time of an input are included in the non-content period D32 as in input information H33, the output control unit 15 may cause input request output information prompting the user to perform an input for identifying target content, to be output by saying that "the previous article? or the current article?".

In addition, in a case where a start time of an input is included in the period D31 in which the content C1 is provided, or the non-content period D32, and an end time of the input is included in the period D33 in which the content C2 is provided, as in input information H34 or H36, the output control unit 15 may cause input request output information prompting the user to perform an input for identifying target content, to be output by saying that "the previous article? or the current article?".

According to the example described with reference to FIG. 12, by using both times of a start and an end of an input, it is possible to identify target content intended by the user, more accurately, and it becomes possible to perform a more appropriate output.

Note that the output control unit 15 may cause a voice prompting speech of the user, such as "please say that tell me in detail if you want to hear in detail", to be output at the beginning of a corner, for example. In addition, the Output control unit 15 may perform description related to identification of target content, such as "please speak in five seconds between a period in which the article desired to be heard in detail is being read, and the following period".

In addition, when the above-described non-content period is too long, an amount of information that can be provided is decreased in a case where a time of a corner is predefined. On the other hand, the non-content period is too short, there is concern that a timing of speaking is missed.

Thus, the output control unit 15 may identify a length of a non-content period in accordance with information associated with the user, and control an output of content so as to obtain the non-content period. Here, the information associated with the user may be at least any one piece of information of a tendency of the user, a state of the user, or a surrounding environment of the user. Note that the identification of the length of a non-content period may be performed by a structural element other than the output control unit 15, and the structural element may be a structural element included in an external device other than the information processing apparatus 1.

For example, in the case of a user having a tendency of performing a voice input by long speech, a non-content period may be set to be long. Note that a user may be identified on the basis of a voice acquired from the sensor unit 30, or the like.

In addition, in a case where the user more concentrates on information presentation performed by a voice, it is considered that a non-content period may be short. For example, a state of the user may be recognized on the basis of information acquired from the sensor unit 30, and a non-content period may be set. For example, the length of a non-content period to be set may be set in such a manner that the length is set to be longer (e.g. seven seconds) in a state in which the user is running, the length is set to be medium (e.g. five seconds) in a state in which the user is walking, and the length is set to be shorter (e.g. three seconds) in a state in which the user is seated.

In addition, if a surrounding environment of the user is an environment having many noises, a non-content period may be set to be longer. Note that information regarding an environment may be recognized on the basis of information acquired from the sensor unit 30, for example.

In addition, a process performed on a user input in the news corner by the information processing apparatus 1 is not limited to the above-described process.

For example, in a case where input information is acquired in a content period in which content is provided, the output control unit 15 may cause output information corresponding to a period from a provision start of the content being provided, to be output.

For example, the output control unit 15 may cause output information including a larger amount of information (more detailed information), to be output, as a period from a provision start becomes longer at an acquisition time of input information. For example, in a case where "tell me in detail" is spoken in a latter half of content, longer output information (including a larger amount of information) than that in a case where "tell me in detail" is spoken in an anterior half of the content may be caused to be output.

In addition, in a case where input information is acquired, the output control unit 15 may cause output information corresponding to a remaining time in which a plurality of contents planned to be provided can be provided, to be output. For example, as the remaining time becomes longer, more detailed output information (with a larger information amount) may be caused to be output.

Note that the remaining time may be a remaining time of use of a service (personal radio service) that is estimated from past behavior of the user. For example, in a case where the user always uses the service during commuting, the remaining time may be a time until a commuting end that is to be estimated. In addition, the remaining time may be a time until a current corner end, for example.

In addition, in a case where a keyword is preset for content, and "tell me in detail" is spoken in a predetermined period from when the keyword is read aloud, new news content related to the keyword may be output.

In addition, by changing BGM (Loop described with reference to FIG. 6) for each content, a breakpoint of content may be clarified more.

In addition, the user can ask about information regarding so-called 5W1H such as "when", "where". "who", "what", "why", and "how". In a case where an asked item exists in a latter half of content, an output of the content may be jumped to the corresponding location.

In addition, in a case where the user speaks "bookmark" in a predetermined period from when a predetermined keyword such as a character name included in content is read aloud, the predetermined keyword such as a character name may be registered in a bookmark.

Note that the speech of "bookmark" can be similarly performed even in corners other than the news corner. For example, content (news, restaurant, event, SNS information) currently being heard by the user, music being reproduced, a photo obtained immediately after photographing, a location or a shop where the user stays for a long time, or the like can be identified as a bookmark target, and registered in a bookmark.

(Output Control Corresponding to Context)

The output control unit 15 may perform output control in accordance with context information. The context information includes, for example, time slot information, content information, behavior information of the user, environment information regarding a surrounding environment of the user, location information regarding a location where the user exists, and the like.

For example, in a case where the same voice command is spoken at different times, it can be more appropriate to perform output control suitable for the time slot. An output control example corresponding to time slot information (e.g. morning or night) is listed below.

Morning: a weather corner starts upon the user speaking "Start", and weathers at the home and a workplace are told.

Night: an area guide corner starts upon the user speaking "Start", and nearby night spot information is told.

In addition, in a case where content is music, an output may be controlled in accordance with mood of the music. An output control example corresponding to beat per minute (BPM) (an example of content information) of music is listed below.

An information-related corner is to be reproduced if BPM<100.

An entertainment-related corner is to be reproduced if 100≤BPM.

Note that, generally, because music with BPM of 60 or less is regarded as slow-tempo ballade music, music with BPM of 80 to 110 is regarded as mean music, and music with BPM of 130 or more is regarded as up-tempo music, this criterion may be used for condition determination.

In addition, an output control example corresponding to behavior information of the user (e.g. whether the user is running or not) is listed below.

If the user speaks "Start" when the user is running, recording of behavior history of the user is started.

If the user speaks "Start" in other times, a corner other than behavior history recording of the user is activated.

In addition, by recognizing a surrounding conversation (an example of environment information), output control corresponding to the surrounding conversation may be performed in the following manner.

If the user speaks "Start" when weather is talked about in the periphery, a weather corner is activated.

If the user speaks "Start" when an afternoon schedule is talked about in the periphery, a schedule corner is activated and an afternoon schedule is read aloud.

In addition, output control corresponding to location information where the user exists can also be performed. For example, the details of a corner may be controlled depending on whether a location where the user exists is a private environment (Private Space) or not (Public Space). An example of output control corresponding to location information is listed below.

In the case of a mail corner:
  Location information: Public Space
    Only the number of newly-incoming mails is read aloud. In addition, in a case where the user speaks "tell me in detail", a title and a body text may be read aloud.
  Location information: Private Space
    A title and a transmitter are also read aloud. In addition, in a case where the user speaks "tell me in detail", a body text may be read aloud. In addition, in this case, depending on the setting of the user, all pieces of information may be read aloud.

In the case of a schedule corner:
  Location information: Public Space
    Only the number of schedules is read aloud. In addition, in a case where the user speaks "tell me in detail", a title and a location may be read aloud.
  Location information: Private Space
    A title, a location, and a time are also read aloud. In addition, in a case where the user speaks "tell me in detail", a body text may be read aloud.

Note that, for example, the condition processing unit 14 may determine that the user is in a private environment, in a case where it is determined on the basis of information acquired from the sensor unit 30 that the user is at his/her home and there is no person around the user (a negative result is obtained for speech detection), and determine that the user is not in a private environment, in other cases.

(Output Control Corresponding to State of Application)

In addition, the output control unit 15 may control an output performed by the output unit 40, in accordance with a state of an application related to the provision of content. The state of the application may include, for example, whether the application is in a background operation or not (whether the application is in a background operation or in a foreground operation).

For example, in a case where input information is acquired when the application is in a foreground operation, on the basis of the input information of the user, a manipulation of the application may be performed and an output of the above-described output information may be performed. On the other hand, in a case where input information is acquired when the application is in a background operation, the input information may be used for a manipulation of not the application but another application being in a foreground operation.

<<4. Hardware Configuration Example>>

The embodiment of the present disclosure has been described hitherto. Finally, a hardware configuration of an information processing apparatus according to the present embodiment will be described with reference to FIG. 13. FIG. 13 is a block diagram illustrating an example of the hardware configuration of the information processing apparatus according to the present embodiment. Meanwhile, an information processing apparatus 900 illustrated in FIG. 20 may realize the information processing apparatus 1 and the server 2 illustrated in FIGS. 1 and 4, for example. Information processing by the information processing apparatus 1 and the server 2 according to the present embodiment is realized according to cooperation between software and hardware described below.

As illustrated in FIG. 20, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 10 illustrated in FIG. 4, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The aforementioned output device 907 may form the output unit 40 illustrated in FIG. 4, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The aforementioned storage device 908 may form the storage unit 50 illustrated in FIG. 4, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may form the communication unit 20 illustrated in FIG. 4, for example.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device. The sensor 915 may form, for example, the sensor unit 30 illustrated in FIG. 4.

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium.

<<5. Conclusion>>

As described above, according to an embodiment of the present disclosure, an output more appropriate for an input of the user can be performed.

The preferred embodiment(s) of the resent disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, the description has been given of an example in which input information is a voice signal, but the present technology is not limited to this example, and can be applied to a case where another type of input information is input. For example, the above-described input information including a time lag between an input start and an input end may be information input by a so-called gesture manipulation such as a flick manipulation in a touch manipulation or a drag-and-drop manipulation in a mouse manipulation.

In addition, steps in the above-described embodiment need not be always processed in chronological order in accordance with the order described as a flowchart diagram. For example, steps in the processes in the above-described embodiment may be processed in an order different from the order described as a flowchart diagram, or may be concurrently processed.

Further, the effects described in this specification are merely illustrative or exemplified effects, and are not limitative, That is, with or in the place of the above effects, the technology according to the present disclosure may achieve other effects that are clear to those skilled in the art from the description of this specification.

Additionally, the present technology may also be configured as below.

(1)

An information processing apparatus including:

an information acquisition unit configured to acquire input information of a user that includes a time lag between an input start and an input end, in a mode in which a plurality of contents are consecutively provided via at least one non-content period; and an output control unit configured, in a case where the input information is acquired in a content period in which first content or second content to be provided at a time later than the first content is being provided, to cause an output unit to output first output information on the basis of the input information, the first content and the second content being included in the plurality of contents, and in a case where the input information is acquired in the non-content period existing between the first content and the second content, to cause the output unit to output second output information different from the first output information, on the basis of the input information.

(2)

The information processing apparatus according to (1), in which the output control unit causes the output unit to output, as the first output information or the second output information, output information related to target content corresponding to acquisition time information of the input information acquired by the information acquisition unit.

(3)

The information processing apparatus according to (2), in which target content of the second output information is the first content.

(4)

The information processing apparatus according to (2) or (3), in which a plurality of non-content periods exist between the first content and the second content, and the output control unit causes the output unit to output the second output information related to the first content, in a case where the input information is acquired in the non-content period existing immediately after the first content, and causes the output unit to output the second output information related to the second content, in a case where the input information is acquired in the non-content period existing immediately before the second content.

(5)

The information processing apparatus according to any one of (2) to (4), in which the output control unit causes the output unit to output input request output information prompting a user to perform an input for identifying the target content.

(6)

The information processing apparatus according to (5), in which the output control unit causes the output unit to output the input request output information in a case where the input information is acquired in a predetermined period from a provision start of the second content in the content period in which the second content is being provided.

(7)

The information processing apparatus according to (5), in which three or more non-content periods exist between the first content and the second content, and the output control unit causes the output unit to output the input request output information in a case where the input information is acquired in the non-content period existing between the non-content period existing immediately after the first content, and the non-content period existing immediately before the second content.

(8)

The information processing apparatus according to any one of (2) to (7), in which the acquisition time information includes a time of the input end.

(9)

The information processing apparatus according to (8), in which the output control unit causes the output unit to output the output information related to target content corresponding to a time of the input start and a time of the input end.

(10)

The information processing apparatus according to any one of (1) to (9), in which, in a case where the input information is acquired in the content period, the output control unit causes the output unit to output the first output information corresponding to a period from a provision start of the content being provided.

(11)

The information processing apparatus according to (10), in which the Output control unit causes the output unit to output the first output information including a larger amount of information, as the period from the provision start becomes longer.

(12)

The information processing apparatus according to any one of (1) to (11), in which a length of the non-content period is identified in accordance with at least any one of a tendency of the user, a state of the user, or a surrounding environment of the user.

(13)

The information processing apparatus according to any one of (1) to (12), in which, in a case where the input information is acquired, the output control unit causes the output unit to output, as the first output information or the second output information, output information corresponding to a remaining time in which the plurality of contents can be provided.

(14)

The information processing apparatus according to any one of (1) to (13), in which the output control unit causes the output unit to output output information corresponding to context information.

(15)

The information processing apparatus according to (14), in which the context information includes at least any one of time slot information, content information, behavior information of the user, environment information, or location information.

(16)

The information processing apparatus according to any one of (1) to (15), in which the output control unit controls an output performed by the output unit, in accordance with a state of an application related to provision of content.

(17)

The information processing apparatus according to any one of (1) to (16), further including a microphone configured to generate the input information by sensing a voice of the user.

(18)

The information processing apparatus according to any one of (1) to (17), in which the plurality of contents are contents classified into a same category.

(19)

An information processing method including:

acquiring, by a processor, input information of a user that includes a time lag between an input start and an input end, in a mode in which a plurality of contents are consecutively provided via at least one non-content period; and in a case where the input information is acquired in a content period in which first content or second content to be provided at a time later than the first content is being provided, causing an output unit to output first output information on the basis of the input information, the first content and the second content being included in the plurality of contents, and in a case where the input information is acquired in the non-content period existing between the first content and the second content, causing the output unit to output second output information different from the first output information, on the basis of the input information.

(20)

A program for causing a computer to implement:

a function of acquiring input information of a user that includes a time lag between an input start and an input end, in a mode in which a plurality of contents are consecutively provided via at least one non-content period; and a function of, in a case where the input information is acquired in a content period in which first content or second content to be provided at a time later than the first content is being provided, causing an output unit to output first output information on the basis of the input information, the first content and the second content being included in the plurality of contents, and in a case where the input information is acquired in the non-content period existing between the first content and the second content, causing the output unit to output second output information different from the first output information, on the basis of the input information.

REFERENCE SIGNS LIST 1 information processing apparatus
2 server
5 communication network
10 control unit
11 communication control unit
12 information acquisition unit
13 speech recognition unit
14 condition processing unit
15 output control unit
20 communication unit
30 sensor unit
40 output unit
50 storage unit
99 information processing system

The invention claimed is:

1. An information processing apparatus comprising:
an information acquisition unit configured to acquire input information of a user that includes a time lag between an input start and an input end, in a mode in which a plurality of contents are consecutively provided via at least one non-content period; and
an output control unit configured,
  in a case where the input information is acquired in a content period in which first content or second content to be provided at a time later than the first content is being provided, to cause an output unit to output first output information on a basis of the input information, the first content and the second content being included in the plurality of contents, and
  in a case where the input information is acquired in the non-content period existing between the first content and the second content, to cause the output unit to output second output information different from the first output information, on a basis of the input information.

2. The information processing apparatus according to claim 1, wherein the output control unit causes the output unit to output, as the first output information or the second output information, output information related to target content corresponding to acquisition time information of the input information acquired by the information acquisition unit.

3. The information processing apparatus according to claim 2, wherein target content of the second output information is the first content.

4. The information processing apparatus according to claim 2, wherein a plurality of non-content periods exist between the first content and the second content, and
the output control unit causes the output unit to output the second output information related to the first content, in a case where the input information is acquired in the non-content period existing immediately after the first content, and causes the output unit to output the second output information related to the second content, in a case where the input information is acquired in the non-content period existing immediately before the second content.

5. The information processing apparatus according to claim 2, wherein the output control unit causes the output unit to output input request output information prompting a user to perform an input for identifying the target content.

6. The information processing apparatus according to claim 5, wherein the output control unit causes the output unit to output the input request output information in a case where the input information is acquired in a predetermined period from a provision start of the second content in the content period in which the second content is being provided.

7. The information processing apparatus according to claim 5, wherein three or more non-content periods exist between the first content and the second content, and
the output control unit causes the output unit to output the input request output information in a case where the input information is acquired in the non-content period existing between the non-content period existing immediately after the first content, and the non-content period existing immediately before the second content.

8. The information processing apparatus according to claim 2, wherein the acquisition time information includes a time of the input end.

9. The information processing apparatus according to claim 8, wherein the output control unit causes the output unit to output the output information related to target content corresponding to a time of the input start and a time of the input end.

10. The information processing apparatus according to claim 1, wherein, in a case where the input information is acquired in the content period, the output control unit causes the output unit to output the first output information corresponding to a period from a provision start of the content being provided.

11. The information processing apparatus according to claim 10, wherein the output control unit causes the output unit to output the first output information including a larger amount of information, as the period from the provision start becomes longer.

12. The information processing apparatus according to claim 1, wherein a length of the non-content period is identified in accordance with at least any one of a tendency of the user, a state of the user, or a surrounding environment of the user.

13. The information processing apparatus according to claim 1, wherein, in a case where the input information is acquired, the output control unit causes the output unit to output, as the first output information or the second output information, output information corresponding to a remaining time in which the plurality of contents can be provided.

14. The information processing apparatus according to claim 1, wherein the output control unit causes the output unit to output output information corresponding to context information.

15. The information processing apparatus according to claim 14, wherein the context information includes at least any one of time slot information, content information, behavior information of the user, environment information, or location information.

16. The information processing apparatus according to claim 1, wherein the output control unit controls an output performed by the output unit, in accordance with a state of an application related to provision of content.

17. The information processing apparatus according to claim 1, further comprising
a microphone configured to generate the input information by sensing a voice of the user.

18. The information processing apparatus according to claim 1, wherein the plurality of contents are contents classified into a same category.

19. An information processing method comprising:
acquiring, by a processor, input information of a user that includes a time lag between an input start and an input end, in a mode in which a plurality of contents are consecutively provided via at least one non-content period; and
in a case where the input information is acquired in a content period in which first content or second content to be provided at a time later than the first content is being provided, causing an output unit to output first output information on a basis of the input information, the first content and the second content being included in the plurality of contents, and
in a case where the input information is acquired in the non-content period existing between the first content and the second content, causing the output unit to output second output information different from the first output information, on a basis of the input information.

20. A non-transitory computer-readable medium having embodied thereon a program, which when executed by a computer causes the a computer to execute a method, the method comprising:
acquiring input information of a user that includes a time lag between an input start and an input end, in a mode in which a plurality of contents are consecutively provided via at least one non-content period; and
in a case where the input information is acquired in a content period in which first content or second content to be provided at a time later than the first content is being provided, causing an output unit to output first output information on a basis of the input information, the first content and the second content being included in the plurality of contents, and
in a case where the input information is acquired in the non-content period existing between the first content and the second content, causing the output unit to output second output information different from the first output information, on a basis of the input information.

* * * * *